United States Patent [19]
Hall, Jr. et al.

[11] Patent Number: 5,483,063
[45] Date of Patent: Jan. 9, 1996

[54] ZERO-SPACED EPITHERMAL NEUTRON MOISTURE DETECTION SYSTEM

[75] Inventors: Hugh E. Hall, Jr., Huntsville; Dan M. Arnold, Katy, both of Tex.

[73] Assignee: Physics, Inc., Huntsville, Tex.

[21] Appl. No.: 249,810

[22] Filed: May 26, 1994

[51] Int. Cl.$^6$ .................................................. G01T 5/10
[52] U.S. Cl. .................................... 250/269.4; 250/390.05
[58] Field of Search ........................ 250/390.05, 390.04, 250/269.4, 360.1

[56] References Cited

U.S. PATENT DOCUMENTS 3,428,806  2/1969  Wack ................................ 250/390.05

OTHER PUBLICATIONS

J. R. Hearst et al., "A Comparison of Moisture Gauge and Neutron Login Air–Filled Holes", Lawrence Livermore National Laboratory, VORL–JC–112454–Revision 1 Apr. 16, 1993.
C. H. M. van Bavel et al., Transactions American Geophysical Union, "Vertical Resolution in the Neutron Method for Measuring Soil Moisture", vol. 35, pp. 595–600, Aug. 1954.
J. W. Nyhan et al., "Spatial Resolution of Soil Water Content by Three neutron Moisture Gauges", Los Alamus National Laboratory (1983) Report No. LA–VR–83–2863.
Zero Spaced Epithermal neutron Login Empty Boreholes, Hugh E. Hall, Jr., Oct. 24–28, 1993 Proceedings of the Fifth International Symposium on Geophysics, Tulsa, Okla.

*Primary Examiner*—Carolyn E. Fields

[57] ABSTRACT

The present invention is directed toward the determination of moisture content per unit volume of material penetrated by a gas filled borehole. An alternate application of the invention is the detection of fractures and vugular cavities in the immediate vicinity of a liquid filled borehole. The apparatus comprises a probe which is conveyed along the borehole. The probe contains a source of neutrons and an epithermal neutron detector at essentially zero longitudinal spacing from the neutron source along the axis of the borehole. In the preferred embodiment, the neutron source is Californium-252 and the epithermal neutron detector comprises a glass scintillator. The response of the system is independent of the thermal neutron absorption properties of the material and the fluid within the borehole.

18 Claims, 3 Drawing Sheets

ZERO-SPACED EPITHERMAL NEUTRON MOISTURE DETECTION SYSTEM

BACKGROUND OF THE INVENTION

This invention is directed to the measurement of moisture content of earth formation in the vicinity of a well borehole using a borehole probe comprising a source of fast neutrons and at least one epithermal neutron detector. More particularly, the invention is directed to high spatial resolution moisture measurements applicable to laminated or thinly bedded formations penetrated by a borehole wherein the borehole is filled with gas, and to fracture or vug detection wherein the borehole is filled with liquid.

Probes containing neutron sources have been used for many years to measure the water content of geologic formations penetrated by a well borehole. The physical principles underlying this type of measurement are based upon the facts that (a) the concentration of the element hydrogen within a formation dominates the neutron diffusion process within the formation, and (b) most hydrogen found in the more common earth formations is in the form of water ($H_2O$). Therefore any measure of the neutron properties of earth formation can be directly related to the water content of the formation. In the petroleum and minerals industries, the measurements of the neutron diffusion properties of earth formations as a function of depth within a borehole penetrating the formations are referred to as neutron "logs". The mining, agriculture and civil engineering industries have also employed neutron diffusion related measurements to determine the moisture content of soil, both in boreholes and at the surface of the earth. Instruments used to perform these measurements have been traditional referred to as "moisture gauges" in these industries.

Accurate and precise measurements of water content in geologic material is obviously desirable. A high degree of spatial resolution in the water content measurement is also desirable, and even critical, in many applications. An engineering application might, as an example, require high vertical resolution in a borehole measurement to determine (a) if water is distributed homogeneously throughout an interval of formation, or (b) if the same average water content is spatially distributed in thin beds containing a relatively high water content laminated alternately with other thin, essentially dry beds. Accuracy and precision of the measurement is controlled by a number of factors including the strength of the neutron source, the efficiency of the neutron detectors, and the time intervals over which the measurements are made. Spatial resolution, however, is a strong function of the distance or "spacing" between the neutron source and the neutron detector. Spatial resolution is affected by other factors such as the actual water content of the formation, but the dominating factor is source to detector spacing. In general, decreasing the spacing increases the spatial resolution of the measurement. In theory, maximum resolution is obtained when the spacing between a point source and a point detector is zero. In practice, the neutron source and the neutron detector will both have finite dimensions, and spacing is defined as the distance between the center of the source and the center of the detector. Maximum spatial resolution is approached as the source and detector are positioned as close together as physically possible.

Now turning specifically to borehole measurements, vertical spatial resolution along the axis if the borehole (vertical resolution) is maximized when the neutron source and the neutron detector are placed on a common plane which is normal to the axis of the borehole. This is zero "effective" spacing in borehole logging geometry and yields the maximum vertical resolution of water content measurements as the borehole is logged. The definitions of "vertical resolution" have varied in the neutron logging industry as well as in the neutron moisture gauge industry. The definitions usually fall under one of two criteria. The first criterion is related to the thinnest bed or zone which can be measured with a logging instrument in which the response of the instrument reaches a set percentage of the response in a homogeneous formation. The second criterion is related to the impulse response function (normally taken as full-width-half-maximum) or a step function (10% to 90% of the change in the response) or some other parameter which relates to the presence or absence of a thin bed. Associated with both criteria is a definition associated with the Fourier transform of the input function or step function response or some section of continuous log. This involves the frequency response of the neutron detector itself as well as other factors such as system noise level. In any definition of vertical resolution, the specific conditions should be specified. Regardless of the definition used, however, vertical resolution tends to increase as the distance between the neutron source and the neutron detector decreases.

Zero spaced thermal neutron measurements in the form of neutron moisture gauges, which essentially are zero spaced neutron logs, both surface and downhole, have been used since about 1950 as reported in Neutron Moisture Gauges, *Technical Report Series* 112, (1970), International Atomic Energy Authority, Vienna. The vertical resolution of an early neutron moisture gauge with a source to detector spacing near 9 cm. has been reported by C. H. M. van Bavel et al, Vertical Resolution in the Neutron Method for Measuring Soil Moisture, *Transactions of the American Geophysical Union*, (1954)Vol. 35, pp. 595–600. These authors reported that vertical resolution is a function of the moisture content of the formation in addition to being a function of source to detector spacing. The works of J. W. Nyhan et al, Spatial Resolution of Soil Water Content by Three Neutron Moisture Gauges, Los Alamos National Laboratory (1983) Report No. LA-UR-83-2863 showed that as source to detector spacing decreased, the effects of moisture content of the formation on vertical resolution increases. There are numerous references in the literature describing neutron logging systems and moisture gauges employing one or more thermal neutron detectors at a non-zero source to detector spacing, one or more thermal neutron detectors at a zero source to detector spacing, and one or more epithermal neutron detectors at non-zero spacings. J. R. Hearst et al, A Comparison of the Moisture Gauge and the Neutron Log in Air-Filled Holes, *Proceedings of the Fifth International Symposium on Geophysics,* Paper O, Tulsa, Okla. Oct. 24–28, 1993provides an excellent review and source of references. No reference is made to any moisture gauge or neutron logging device employing the detection of epithermal neutrons at zero spacing. It should be noted that there are advantages and disadvantages in measuring neutrons in the thermal and epithermal range in moisture gauges, especially in borehole applications. Very briefly, for a given formation, source to detector spacing and fast neutron source, the flux of thermal neutrons in the region of the detector is normally greater than the flux of epithermal neutrons. When using equal volume thermal and epithermal neutron detectors, with the latter consisting of cadmium wrapped around a thermal neutron detector, the count rate using the thermal neutron detector is normally larger than that of the epithermal detector. The statistical error in moisture gauges is therefore normally less when detecting neutrons in the thermal range rather that in the epithermal range. However, epithermal neutrons are much less sensitive to changes in the formation or type of liquid contained within the formation, and in particular, are almost insensitive to any changes in salinity of the fluids contained in the surrounding media. Stated another way, the epithermal neutron log is much less dependent on changes in the thermal neutron cross section or presence of high thermal neutron cross section elements in the volume surrounding the probe than is a thermal neutron log.

It is known that sensitivity of shod spaced neutron moisture gauges for measuring moisture in formations is greatly reduced when the borehole is liquid filled rather than air filled. Therefore, in prior work, the long spaced neutron log has been used to measure moisture content of formations in liquid filled boreholes. It has been found that with the current invention that in liquid filled boreholes, the probe is quite sensitive to non-uniform formations such as those resulting from fractures or rugs or any form of liquid filled cavities in the formation close to a zero-spaced epithermal neutron probe. The current invention can therefore be used as a fracture or rug detector in liquid filled boreholes.

In light of the above discussion, it is apparent that a high resolution, neutron based moisture gauge designed to operate in gas filled boreholes would incorporate the feature of zero effective source-detector spacing to optimize vertical resolution, and also incorporate the detection of epithermal neutrons to obtain accurate and precise measurements in gas filled boreholes.

SUMMARY OF THE INVENTION

One objective of the current invention is to provide high vertical resolution moisture measurements of earth formations penetrated by a borehole. This is accomplished with a borehole probe comprising a source of fast neutrons and a neutron detector at an effective zero spacing from the source. Another objective of the current invention is to provide accurate and precise measurements of formation moisture content in boreholes filled with gas. This is accomplished by measuring neutrons in the epithermal energy range. Another objective is to detect, in liquid filled boreholes, formation fractures or vugular cavities in close proximity to the probe's minimal source to detector spacing. Still another objective of the current invention is to acquire high resolution formation moisture measurements in gas filled boreholes using equipment that is relatively inexpensive to build, maintain and operate.

The logging system comprises three general components which are the downhole probe, surface electronics to power the probe and to receive and process data from the probe, and a cable and draw works to convey the probe within the well bore and also to serve as a data and power conduit between the probe and the surface equipment.

As stated previously, the probe contains a source of fast neutrons and an epithermal neutron detector positioned such that the effective source to detector spacing is zero. The physical dimensions of the source be small, since the effective spacing of the probe must be zero. It is also necessary for the source to have a relatively high neutron output per unit volume, not only because of the spacing requirements but also to maximize the measured detector response for statistical reasons. The neutron emitting isotope Californium-252 ($^{252}$Cf) meets these basic requirements. The neutron detector contained is also physically small to meet zero effective spacing requirement. The detector must also have a relatively high efficiency per unit volume to minimizes statistical error associated with the measurement. Finally, the detector must be sensitive primarily to epithermal neutrons. A lithium glass scintillators wrapped with a thin layer of cadmium meets all of these requirements and is used as the scintillation crystal component of the detector. The scintillator is optically coupled to a remotely spaced photomultiplier tube using a quartz light guide. Neutrons impinging upon the cadmium wrapped scintillator produce optical scintillations within the crystal. The cadmium wrap absorbs essentially all thermal neutrons but passes epithermal neutrons. The number of optical scintillations is proportional to the number of epithermal neutrons interacting with the glass scintillator, and for practical purposes is equal to that number. The photomultiplier converts these optical scintillations into electrical pulses. In such an epithermal neutron detector, the size of the output electrical pulses due to epithermal neutrons all lie within an approximate Gaussian distribution having a full width at half maximum on the order of 15% to 35%. These pulses due to thermal neutrons are normally superimposed on background pulses of varying heights. The sonde also contains suitable control electronics to both operate the photomultiplier tube, preamplify the output electrical pulses, and to transmit pulses from the detector system to the surface over the logging cable.

The logging cable may be armored and contains at least one electrical conductor. The functions of the, cable are (a) to convey the probe into and out of the borehole, (b) to serve as a conduit through which power is supplied to the probe, and (c) to serve as a conduit to transmit data from the probe to the surface. The first end of the cable is terminated at the probe and the second end is terminated at the winch of the surface draw works thereby suspending the probe within the well borehole. The actual point of suspension is a calibrated sheave wheel over which the cable passes. Signals transmitted over the cable from the probe are passed through slip rings of the winch drum and input to the surface equipment in a manner well known in the art. Power to operate the neutron detector system and control electronics is supplied from the surface through the slip rings and down the cable to the probe. The calibrated sheave wheel over which the cable passes serves as a means of tracking the depth of the probe as it is conveyed within the borehole. Alternatively, in shallow boreholes, continuous logging or station measurements can be made by conveying the probe along the borehole using a manually operated winch or other manually operated draw means.

The surface equipment comprises amplification, control, processing and recording components required to convert raw data into moisture content of the earth formation as a function of depth within the borehole. In addition, the surface equipment comprises power supplies to power both the probe and all other components of the surface system. Pulses transmitted from the probe, over the logging cable to the surface, are further amplified. The gain of the downhole detector system is monitored and controlled within the surface equipment. Pulses are sorted by height at the surface using well known pulse height analysis methods thereby yielding spectral data in the form of a peak representing the intensity of impinging epithermal neutrons superimposed on a background which decreases with increasing pulse height or energy. These spectral data are recorded as a function of sonde depth within the borehole using depth pulses generated by the calibrated sheave wheel system. Spectral data, in units of counts per unit time, are then corrected for the background or "noise" and then converted to the desired moisture content readings as a function of depth. As a final product of the moisture logging operation, formation moisture content as a function of depth is recorded as an analog trace, a digital tabulation or any other in any other suitable format required by the user. Likewise, as a final product of the fracture or vug determination in liquid filled boreholes, the neutron intensity which reflects the presence of fractures and vugs as a function of depth is recorded as an analog trace, a digital tabulation or any other suitable format required by the user.

Embodiments of the invention summarized above have been directed toward borehole applications and more particularly toward the measure of moisture content of material penetrated by the borehole and the presence of fractures and vugs in the immediate vicinity of the borehole. There are other equally effective embodiments of the invention in the measure of properties of material. Any material property which perturbs the flux of epithermal neutrons generated by the neutron source can, in principle, be measured with the invention. An example of such an additional material property might be the concentration of an epithermal neutron absorbing element within the material such as the element cadmium.

BRIEF DESCRIPTION OF THE DRAWINGS

So that the manner in which the above recited features, advantages and objects of the present invention are obtained and can be fully understood in detail, more particular description of the invention, briefly summarized above, may be had by reference to the embodiments thereof which are illustrated in the appended drawings. It is to be noted, however, that the appended drawings illustrate only typical embodiments of the invention and are therefore not to be considered limiting of its scope for the invention may admit to other equally effective embodiments.

DETAILED DESCRIPTION OF THE PREFERRED EMBODIMENT

THEORY OF THE MEASUREMENT

A two group method of calculating the population of slow neutron about a source of fast neutrons was put forward by Beckurts and Wirts (1964) and provides a good approximation for mathematically modeling the response of the present invention. Using this method and taking the limit as the radial dimensions approach zero, the epithermal flux can be written as $$\emptyset(0) = q / [4\pi \Sigma L_s L_d (L_s + L_d)] \quad (1)$$

where:

$\emptyset(0)$=the epithermal neutron flux at the location of the neutron point source (n/cm²-sec);

q=the fast neutron source strength (n/s);

$\Sigma$=the macroscopic slowing down cross section from epithermal to thermal energies (cm⁻¹);

$L_s$=the slowing down length from fast to epithermal energies (cm); and $L_d$=the epithermal diffusion length (cm).

In neutron logging probes with source to detector spacings less than what is known in the ad as the turning or cross-over point, it is well known that as the hydrogen content of the formation increases, the response of the neutron detector increases. This result from the decrease in $L_s$ and $L_d$ with increasing hydrogen content, even though $\Sigma$ often increases. That is, the former terms dominate. As formation density decreases, $L_s$ and $L_d$ increase while $\Sigma$ normally decreases. Again, the former terms dominate, resulting in a neutron flux decrease as the formation density decreases at a constant moisture content.

EQUIPMENT

Figures 1, 1A:
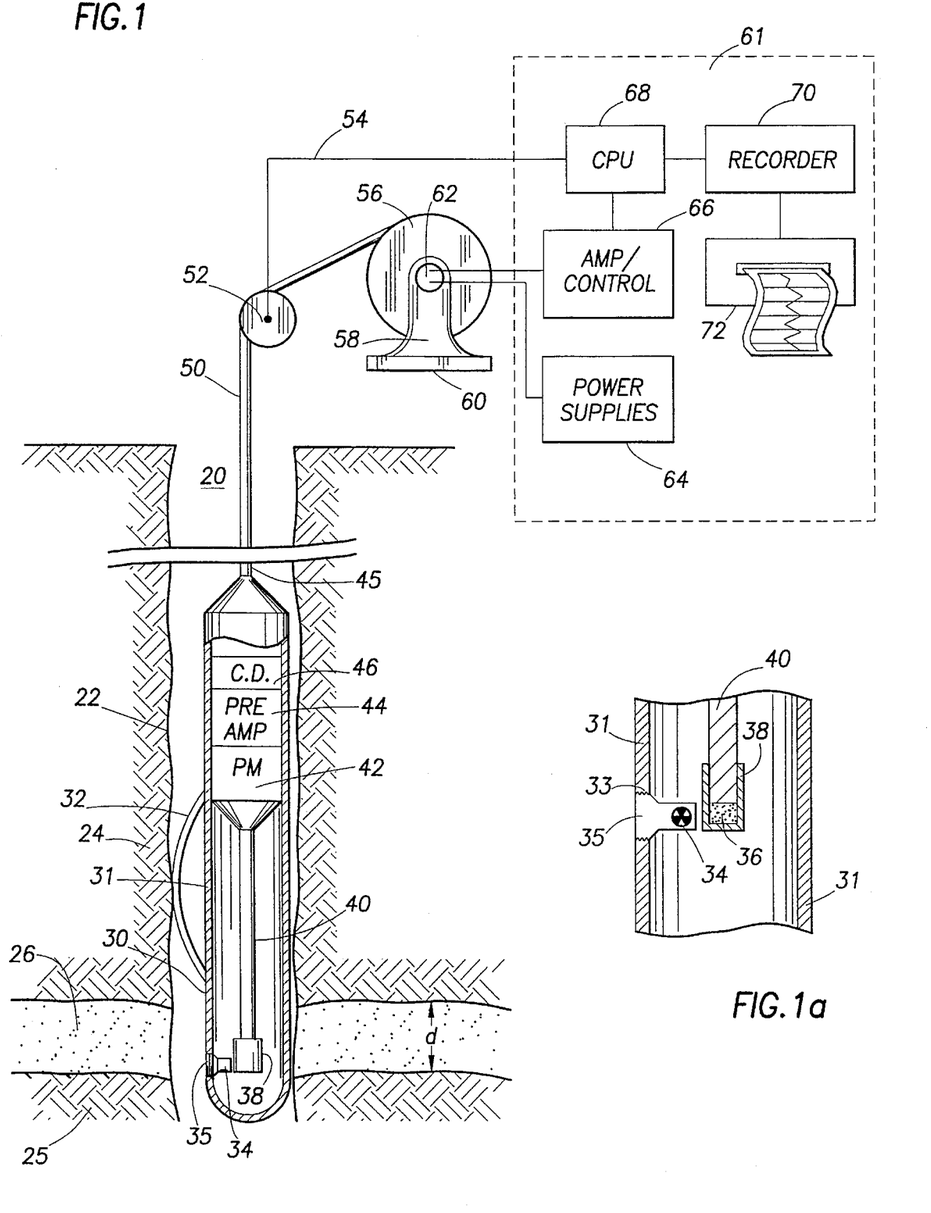
FIG. 1 is a schematic depiction of the major components of the zero spaced neutron logging system.

FIG. 1 illustrates the major elements of the zero spaced neutron logging system. The term "zero spaced" is used for brevity. The system actually employs zero effective source to detector spacing in that the center of the source and the center of the detector are in a plane which is normal to the axis of the downhole logging probe 30. The downhole logging probe 30 is suspended in the well borehole 20 by the logging cable 50. The probe is normally operated decentralized within the borehole by means of decentralizing bow spring 32. Decentralized operation tends to increase the observed signal from the formation. Borehole 20 is depicted as penetrating earth formations 24, 25, and 26. Formation 26 is a relatively thin bed of vertical thickness d. Response of the system across a thin bed with adjacent thick side beds will be illustrated later. The outer fluid-tight pressure housing or "casing" of the probe, which is under 5.0 centimeters (cm) in diameter and about 60 cm long, is identified by the numeral 31. The source of fast neutrons 34 is mounted within the threaded male plug 35 which screws into the wall of casing 81 at female threaded pod 33. The plug-casing seal is both fluid and pressure tight. Details of the source mounting with respect to the probe casing and detector are more clearly illustrated in expanded FIG. 1a. The preferred isotope for the neutron source 34 is Californium-252($^{252}$Cf) although other isotopic sources such as a mixture of Americium and beryllium can be used.

The neutron detector system and associated control electronics are mounted axially within the probe casing 30 and will be discussed in detail in subsequent sections. Scintillator 36 is generally cylindrical in shape with the axis of the cylinder being parallel to the axis of the probe 30. The preferred scintillation scintillator material is lithium doped glass such as GS-20 lithium glass manufactured by Levy West of London, U.K. and distributed by Bicron Corporation of Newbury, Oh., U.S.A. In the preferred embodiment, the diameter is about 6 millimeters (ram) and the length is about 1 mm. The dimensions can be varied so long as the previously discussed zero effective spacing criterion is maintained. The scintillator 36 is enclosed in a thin cylindrical shell 38 of thermal neutron absorbing material such as cadmium (Cd). The inside diameter of the shell is sufficiently large to fit over the scintillator 36 with the axial length being sufficient to extend the shell well past the scintillator in the uphole direction in order to prevent unwanted thermal neutrons from impinging upon the scintillator from the uphole direction. The thickness of the cadmium is at least 0.5 millimeters (mm) or thicker such that essentially all thermal neutrons are absorbed and the zero effective spacing criterion is maintained. The center of source 34 and scintillator 36 are in a common plane which is perpendicular to the axis of the probe 30.

The scintillator 36 is optically coupled to a first end of a cylindrical light guide 40 which is about 7 mm in diameter and about 35 cm long. The preferred light guide material is quartz although other materials can be used. The second end of the light guide 40 is conical in shape and is optically coupled to the photomultiplier tube 42 of the type 6993 manufactured by Hamamatsu or the like. Photomultiplier tube 42 converts optical scintillations from the scintillator 36 into electrical pulses, the amplitudes being proportional the intensities of the scintillations which are, in turn, proportional to the energies of the impinging neutrons. The dimensions of the light guide can be varied so long as the geometric requirements of zero effective spacing are maintained. The photomultiplier tube 42 is electrically connected to the preamplifier 44 wherein the pulses from the photomultiplier are amplified for the first time and transmitted over the logging cable 50 by the cable driver circuit 46. The cable driver transmits pulses to the surface over one or more electrical conductors within the cable, with the probe 30 being mechanically and electrically attached to the logging cable 50 at the cable head 45.

The logging cable 50 and the probe 30 are suspended in the borehole 20 by means of the calibrated sheave wheel unit 52 which is also electrically connected to the CPU 68 through path 54. The sheave unit outputs an electrical pulse for each revolution of the wheel. The circumference of the wheel is known, therefore, the number of output pulses can be related to the depth of the probe 30 within the borehole 20. The second end of the logging cable 50 is mechanically terminated at the winch drum 56 although pulses transmitted from the probe 30 are passed from the second cable terminus through the slip rings 60 to the surface equipment. The winch drum 56 is rotated about its axis supported by brackets (one being shown and identified by the numeral 58) using suitable means of power (not shown) thereby conveying the probe 30 within the borehole 20.

The surface equipment, identified as a whole by the numeral 61, comprises several components whose functions will be described separately. Pulse signals from the probe pass through the slip rings 62 to an amplifier 66 for further amplification. Detector gain can also be controlled at this point if needed. Subsequently, the pulses pass to the CPU 68 where they are sorted to form neutron energy spectra as sensed by the downhole detector system. Pulse sorting is performed using well known pulse height analysis methods. Other functions are also performed in the CPU 68. Spectra are processed in the CPU to extract signal resulting only from epithermal neutrons impinging upon the detector 36. A second embodiment employs pulse shape discrimination methods to extract the epithermal neutrons signal from the composite measurement. Pulse shape discrimination methods are well known in the art. In the alternate embodiment, pulses are sorted by shape using circuitry (not shown) prior to inputting the data into the CPU 68 or within the CPU 68. The resulting epithermal neutron signals are next merged with data input from the calibrated sheave unit 52 producing epithermal neutron signals as a function of depth at which they were measured. Finally, neutron signals as a function of depth are converted to formation moisture as a function of depth using a predetermined calibration algorithm as will be discussed later. These results are output from the CPU 68 to the recorder 70 for storage and subsequent analysis. In addition, moisture content measurements as a function of depth are output in analog or graphical form by the recorder 72.

DATA PROCESSING

Figure 2:
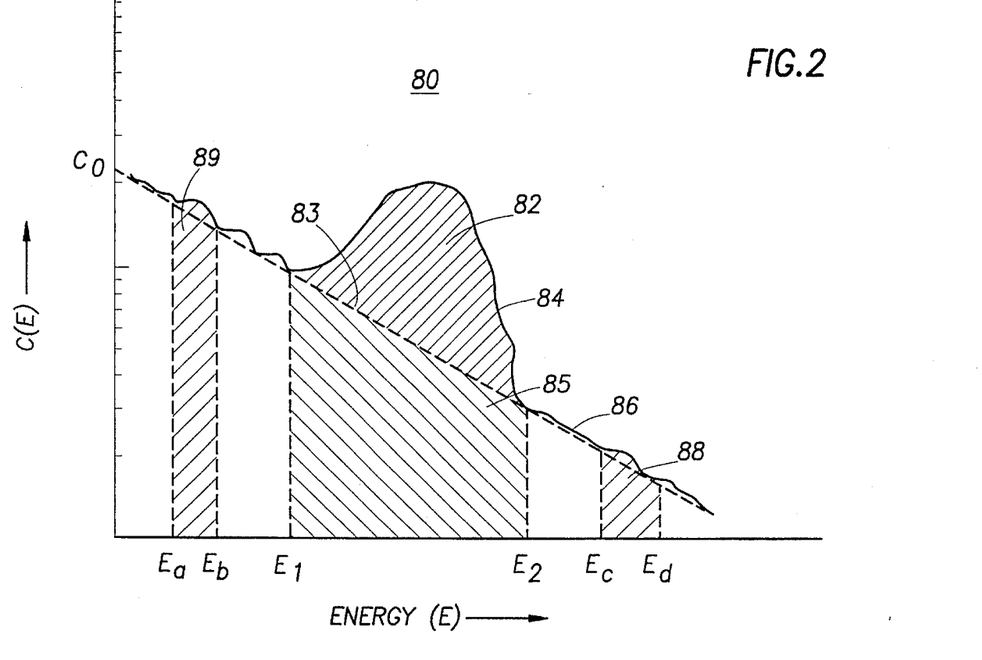
FIG. 2 illustrates an neutron energy spectrum as measured by the system as well as a graphical demonstration of the background correction method.

FIG. 2 depicts a typical neutron spectrum 80 generated within the CPU from pulses from the probe 30. The spectrum consists of a plot of count rate C(E) per energy increment versus neutron energy. C(E) is plotted on a logarithmic scaled ordinate and E is plotted on a linear scaled abscissa. Using well known pulse height analysis techniques mentioned earlier, values of energy E can be correlated directly to the energy bin number or "channel" into which pulses of corresponding amplitude are sorted and stored. The resulting curve exhibits a peak 84 between the energies $E_1$ and $E_2$ (or corresponding pulse height analyzer channels) the total area under the peak representing the sum of contributions from epithermal neutrons, illustrated graphically by the area 82 and background, illustrated graphically by the area 85. The background component is logarithmic as a function of energy and is represented by the broken line 83. Between the energy ranges $E_1$ and $E_2$, the total measured count rate $C_T$ is expressed as:

$$C_T = C_S + C_B \quad (2)$$

where $C_S$ is the signal represented by area 82 and $C_B$ is the background represented by the area 85. Counts falling within the energy range $E_a$ to $E_b$ are also measured and will be designated as $B_1$ and depicted graphically by the area identified by the numeral 89. In addition, counts falling within the energy range $E_c$ to $E_d$ are measured and will be designated as $B_2$ and depicted graphically by the area identified by the numeral 88. Relations for $B_1$ and $B_2$ can be written as $$B_1 = [e^{-sE_a} - e^{-sE_b}][C_o/s] \quad (3)$$

and $$B_2 = [e^{-sE_c} - e^{-sE_d}][C_o/s] \quad (4)$$

where $C_o$ is the intercept of curve 83 at energy E=0 and s is the decay constant of the background curve 83. Equations (3) and (4) can be solved simultaneously for $C_o$ and s since all other terms are either measured are known. If $(E_b-E_a)$ $(E_2-E_1)$ and likewise $(E_d-E_c)<<(E_2-E_1)$, approximate solutions for $C_o$ and s are $$s = 2[E_b + E_a - E_d - E_c] \ln [B_2(E_b E_a) / B_1(E_d - E_c)] \quad (5)$$

and $$C_o = s \, B_1/(e^{-sE_a} - e^{-sE_b}) \quad (6)$$

where all terms on the right hand sides of equations (5) and (6) are measured or predetermined. The background $C_B$ designated by the numeral 85 is therefore $$C_B = [C_o/s][e^{-sE_1} - e^{-sE_2}] \quad (7)$$

where all terms on the right hand side of equation (7) have now been determined previously. Finally, the desired neutron signal $C_S$ designated by the numeral 82 is then calculated from the relationship $$C_S = C_B \tag{8}$$

where $C_T$ is measured and $C_B$ is determined from equation (7). The above is the preferred method of extracting epithermal neutron signal from the background. As mentioned previously, pulsed shape discrimination is an alternate means for obtaining $C_s$.

CALIBRATION AND TEST RESULTS

Figure 3:
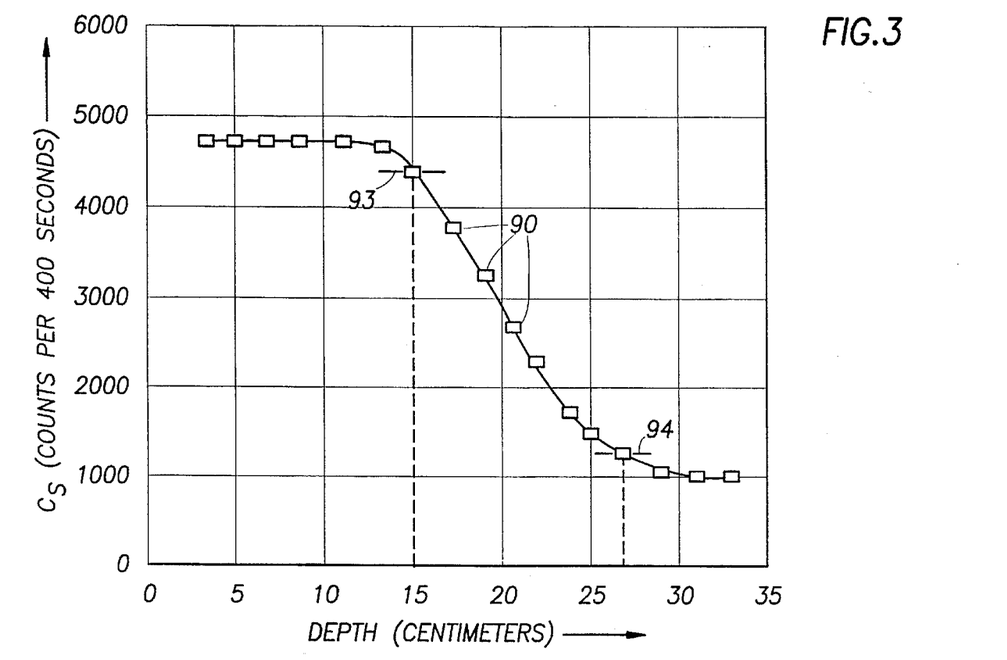
FIG. 3 illustrates the dynamic range of the logging measurement by depicting response across the boundary of a dry test formation and a test formation which contains the equivalent of 49% grams of water per unit volume of sugar, hereafter specified as 49% water by volume.

FIG. 3 illustrates the epithermal neutron signal $C_S$ measured as a function of depth in two test formations of known apparent water content. In this example, $C_s$ is expressed as counts per 400 seconds and depth is expressed in centimeters (cm). The curve 90 represents the system response across a formation interface at 20 cm. The upper formation is composed of sucrose ($C_{12}H_{22}O_{11}$) with a bulk density of 0.85 grams/cm$^3$ and a hydrogen content of 6.4% by weight. This formation contains the equivalent of 49% grams of water per unit volume of sugar and will hereafter be specified as the equivalent of 49% water by volume. That is, since the probe responds primarily to hydrogen, the response is the same as if the formation were composed of a non-hydrogenous sand matrix with a 77% pore volume saturated with water. This is apparent when one considers the difference in the density of sugar and the grain density of sand which is approximately 2.63 grams/cm$^3$. The lower formation is dry sand (4.0 Flintshot) with a bulk density of 1.54 grams/cm$^3$. If one defines vertical resolution to be the depth interval between the depth at which a step function responses change from 10% (identified by the numeral 93) to 90% (identified by the numeral 94) of its final change, the vertical resolution of the system across the bed boundary at the depth of 20 cm would be 13 cm. As a reference, the vertical resolution of neutron logs used in the petroleum industry is still of the order of 30 to 60 cm.

Figure 4:
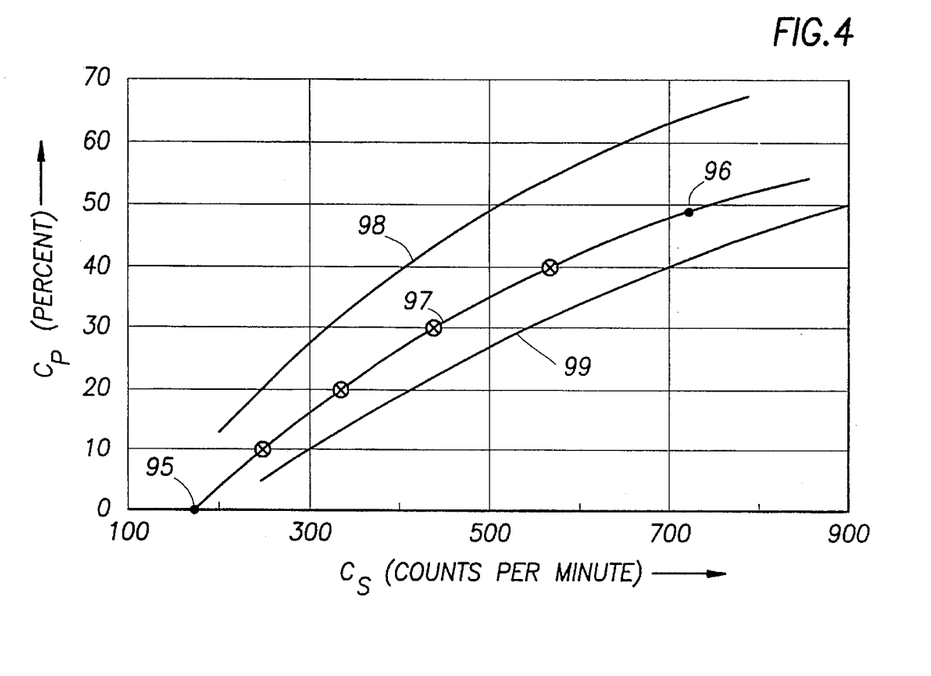
FIG. 4 illustrated the method of converting measured data to corresponding formation moisture content.

The data depicted in FIG. 3 can also be used to illustrate the development of the calibration algorithm with which the system response is converted from the measured quantities in pulses or counts per unit time to the desired units of percent water content. In the formation containing 49% water by volume, the epithermal neutron signal is approximately 4800 counts per 400 seconds or 720 counts per minute. In the dry sand formation (0% water content) the response is approximately 110 counts per 400 seconds or 165 counts per minute. Similar measurements can be made in additional test formations containing known water content by volume between the values of 0 and 49% thereby generating a set of calibration data as illustrated in FIG. 4. The points at 0% and 49% are identified by the numerals 95 and 96, respectively while representative additional measurements are illustrated for test formations with water content by volume of 10%, 20%, 30% and 40% with the same matrix density. A curve 97 is fitted to the measured data points yielding a calibration conversion equation of the form $$C_p = a(q) + b(q) \, C_s + c(q) \, C_s^2 \tag{9}$$

where $C_p$ is defined as the response of the system in units of percent water content by volume and $a(q)$, $b(q)$, and $c(q)$ are calibration factors which are a function of formation matrix density q. This effect of density is discussed in the publication "Neutron Moisture Gauges" *Technical Report Series* 112 (1970) which has been referenced previously. Curves 98 and 99 identify curves determined in the same manner as curve 97 but with test formations with greater and lesser matrix densities, respectively. The calibration factors $a(q)$, $b(q)$ and $c(q)$ can also be expressed as polynomial functions of density in the form $$a(q) = a_1 + b_1 q + c_1 q^2$$
$$b(q) = a_2 + b_2 q + c_2 q^2 \tag{10}$$
$$c(q) = a_3 + b_3 q + c_3 q^2$$

where $a_i$, $b_i$ and $c_i$ (i=1,2,3), are predetermined calibration constants. Combining equations (9) and (10) yields a relationship for $C_p$, water content by volume in terms of the measured quantity $C_s$, calibration constants $a_i$, $b_i$ and $c_i$, (i=1,2,3) and the formation matrix density q. Appropriate values for q must be estimated or obtained by independent measurements of other means and methods. It should be understood that analytical representation of the calibration curve is not limited to the polynomial form illustrated in equation (4).

Figure 5:
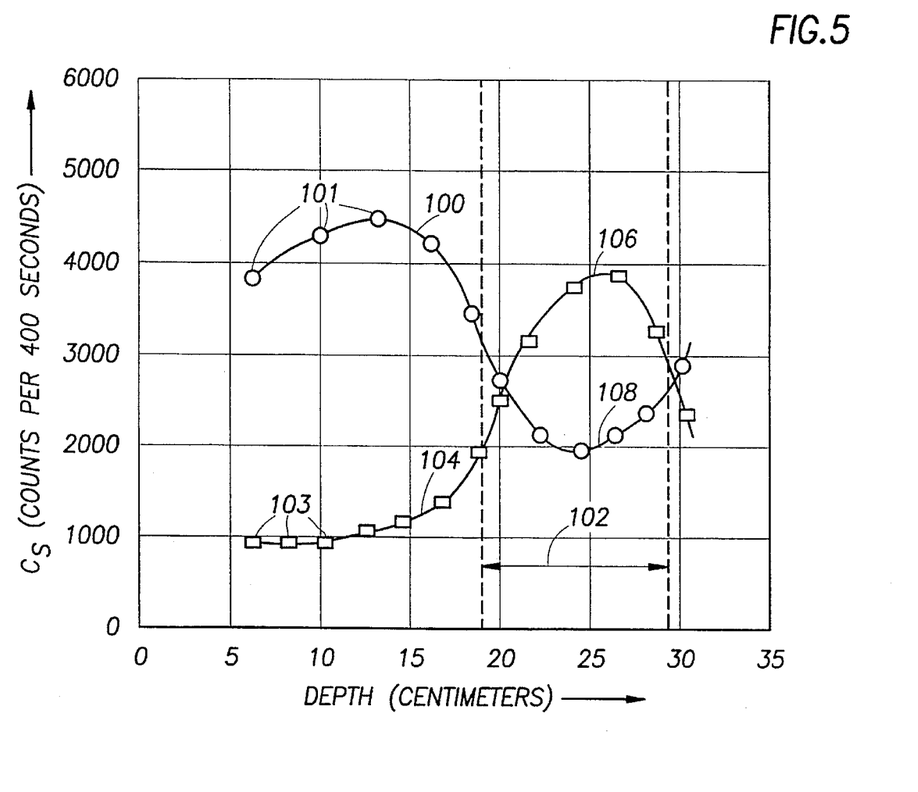
FIG. 5 illustrates the vertical resolution of the logging system by depicting response across a thin bed of dry formation with side beds containing 49% water by volume and also the response across a thin bed of formation containing 49% water by volume with dry side beds.

FIG. 5 illustrates the response of the logging system to thin beds in two formation sequences. In the first sequence comprises a 10 cm thick bed containing 49% equivalent water with adjacent side beds containing 0% water. The thin bed extends from a depth of 19 cm to a depth of 29 cm as designated by the numeral 102. The system response is illustrated in units of counts per 400 seconds, although response can be converted to percent water content as described in the previous section and as illustrated in FIG. 5. The data points 103 are plotted as a function of depth within the test borehole at which they were measures and are connected by the curve 104 for purposes of illustration. The apparent bed thickness as measured by the system, defined as one half of the maximum response, is 11 cm and the amplitude 106 of the response is 82% of the response seen in the same type of formation but of infinite thickness. The second sequence comprises a 10 cm thick dry bed, again extending from the depth of 19 cm to 29 cm, with adjacent side beds containing the equivalent of 49% water by volume. Measured data points 101 are connected by the curve 100 for illustration purposes. The response is again depicted in counts per 400 seconds. There is some decrease in the depth interval of 0 to 10 cm due to end effects at the top of the test formation which was air. The apparent bed thickness using the previous definition is 12 cm for this formation sequence with the maximum response 108 being 71% of the system response in a thick bed of the same water concentration. In both formation sequences, the thin beds are clearly resolved although the apparent bed thickness as measured by the system are slightly greater than the actual bed thickness.

While the methods and forms of the apparatus herein described constitute preferred embodiments of this invention, it is to be understood that the invention is not limited to these precise methods and forms of apparatus, and that changes may be made therein without departing from the scope of the invention.

What is claimed is:

1. An apparatus for measuring the moisture content of material, comprising:

(a) a probe;

(b) a source of neutrons contained within said probe;

(c) an epithermal neutron detector contained within said probe with said epithermal neutron detector being positioned sufficiently close to said neutron source such that the source to detector spacing is effectively zero and the response of said epithermal neutron detector increases with moisture content of said material;

(d) means for supplying power to said epithermal neutron detector;

(e) means for recording the response of said epithermal neutron detector; and (f) means for converting said response of said epithermal neutron detector to said moisture content of said material.

2. The apparatus of claim 1 wherein said epithermal neutron detector comprises a scintillator.

3. The apparatus of claim 2 wherein said neutron source comprises Californium-252.

4. The apparatus of claim 3 wherein the measured moisture content comprises the moisture content per unit volume of said material.

5. A method for determining moisture content of material, comprising the steps of:

(a) providing a probe;

(b) providing a source of neutrons within said probe;

(c) providing an epithermal neutron detector within said probe with said epithermal neutron detector being positioned sufficiently close to said neutron source such that the source to detector spacing is effectively zero and response of said epithermal neutron detector increases with increasing moisture content per unit volume of said material;

(d) providing means for supplying power to said epithermal neutron detector;

(e) providing means for recording said response of said epithermal neutron detector; and (f) for converting said detector response into measured moisture content.

6. The method of claim 5 wherein said detector response is counting rate.

7. The method of claim 6 wherein said counting rate is corrected for all contributions other than those generated by epithermal neutrons impinging upon said detector thereby generating a first corrected counting rate.

8. The method of claim 7 wherein said first corrected counting rate is corrected for the effects of variations in the density of said material thereby generating a second corrected counting rate.

9. The method of claim 8 wherein said second corrected counting rate is converted into a measure of the moisture content per unit volume of said material.

10. An apparatus for measuring moisture content of material penetrated by a borehole comprising:

(a) an elongated, fluid tight borehole probe;

(b) a source of neutrons contained within said borehole probe;

(c) an epithermal neutron detector contained within said borehole probe with said epithermal neutron detector being positioned sufficiently close to a plane perpendicular to the axis of said borehole probe and passing through said neutron source such that the source to detector spacing is effectively zero and response of said epithermal neutron detector increases with moisture content said material;

(d) means for supplying power to said epithermal neutron detector;

(e) means for conveying said borehole probe along said borehole;

(f) means for tracking the depth of said borehole probe within said borehole;

(g) means for recording the response of said epithermal neutron detector; and (h) means for converting said response of said epithermal neutron detector into measures of moisture content of said material as a function of depth within said borehole.

11. The apparatus of claim 10 wherein said epithermal neutron detector comprises a scintillator;

12. The apparatus of claim 11 wherein said neutron source comprises Californium-252.

13. The apparatus of claim 12 wherein said scintillator comprises lithium glass.

14. The apparatus of claim 13 wherein said means of conveying said borehole probe comprises a wireline with a first end attached to said borehole probe and a second end attached to a winch means.

15. A method for measuring the moisture content of material penetrated by a borehole, comprising the steps of:

(a) providing an elongated, fluid tight borehole probe;

(b) providing a source of neutrons contained within said borehole probe;

(c) providing an epithermal neutron detector contained within said borehole probe with said detector being positioned sufficiently close to a plane perpendicular to the axis of said probe and passing through said neutron source such that the source to detector spacing is effectively zero and the response of said epithermal neutron detector increases with increasing moisture content of said material;

(d) providing power for said epithermal neutron detector;

(e) providing means for tracking the depth of said borehole probe within said borehole;

(f) providing means for recording the response of said epithermal neutron detector; and (g) providing means for converting said response of said epithermal neutron detector into a measure of moisture content of said material.

16. The method of claim 15 wherein said detector response is counting rate and said counting rate is corrected for any contributions other than those induced by epithermal neutrons impinging upon said detector thereby forming a first corrected counting rate.

17. The method of claim 16, wherein said first corrected counting rate is corrected for variations in the density of said material thereby creating a second corrected counting rate.

18. The method of claim 17 where, in a gas filled borehole, said second corrected counting rate is converted into a measure of moisture content per unit volume of material as a function of depth within said borehole.

\* \* \* \* \*

UNITED STATES PATENT AND TRADEMARK OFFICE
CERTIFICATE OF CORRECTION

PATENT NO. : 5,483,063
DATED : January 9, 1996
INVENTOR(S) : Hugh E. Hall, Jr, and Dan M. Arnold It is certified that error appears in the above-indentified patent and that said Letters Patent is hereby corrected as shown below:

Column 2, line 51, delete "1993provides" and insert --1993, provides--.
Column 3, line 10, delete "shod" and insert --short--.
Column 4, line 26, delete "the," and insert --the--.
Column 6, line 12, delete "ad" and insert --art--.
Column 6, line 44, delete "81" and insert --31--.
Column 6, line 60, delete "(ram)" and insert --(mm)--.
Column 7, line 34, delete"the:" and insert --the--.
Column 8, line 44, delete "$[e^{-sE_c} - e^{-sE_d}]$" and insert --$[e^{-sE_c} - e^{-sE_d}]$--.
Column 9, line 48, please delete "0" and insert --0%--.

Column 8, line 63, please delete "$[e^{-sE_1} - e^{-sE_2}]$" and insert --$[e^{-sE_1} - e^{-sE_2}]$--.

Signed and Sealed this

Sixteenth Day of April, 1996

BRUCE LEHMAN

Attest:

Attesting Officer     Commissioner of Patents and Trademarks